Dec. 23, 1924. 1,520,014

H. A. CUMFER

MACHINE FOR MAKING ASPHALT ROOFING

Filed May 26, 1921 3 Sheets-Sheet 1

Inventor:
Harry A. Cumfer

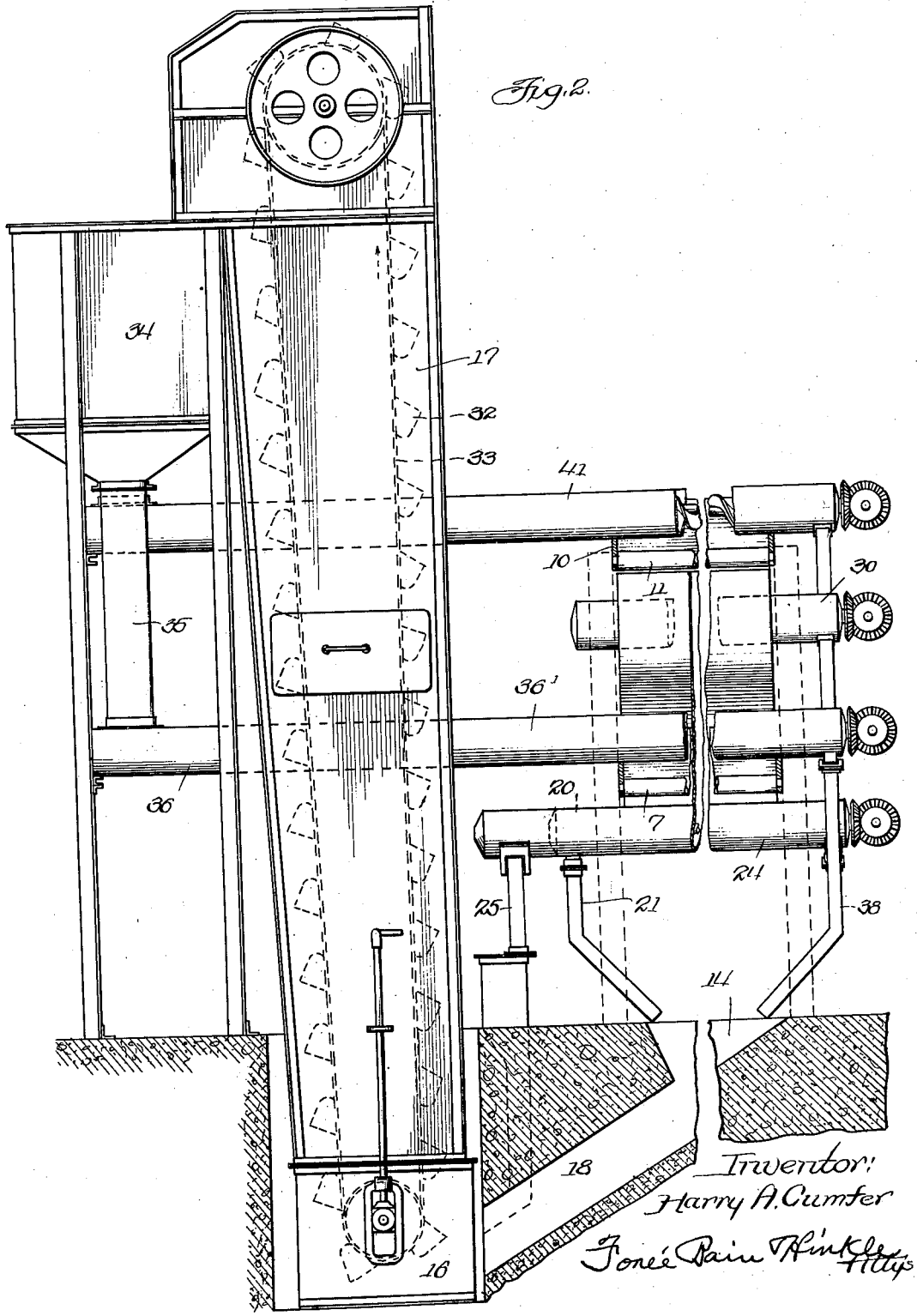

Dec. 23, 1924.
H. A. CUMFER
1,520,014
MACHINE FOR MAKING ASPHALT ROOFING
Filed May 26, 1921
3 Sheets-Sheet 3
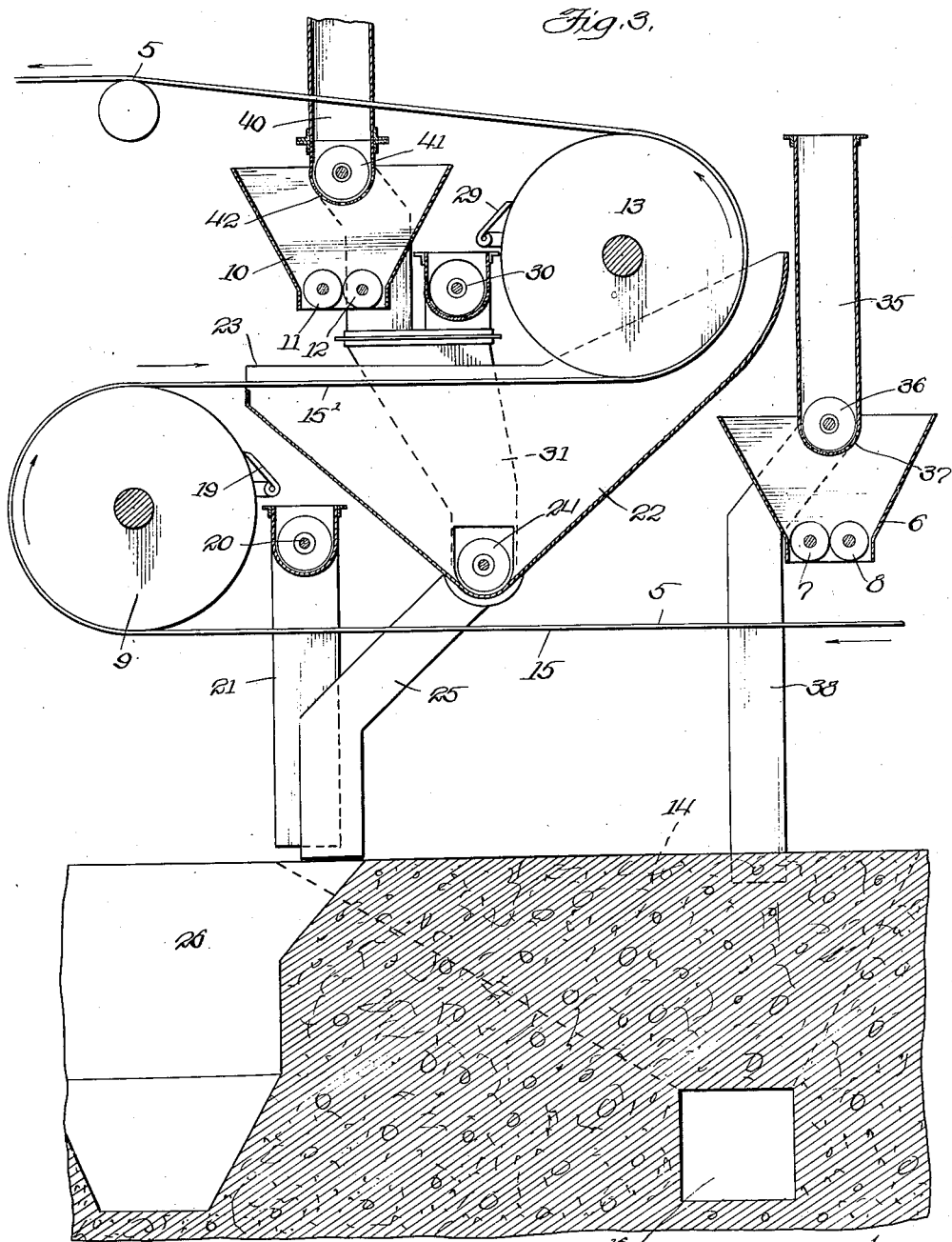

Patented Dec. 23, 1924.

1,520,014

UNITED STATES PATENT OFFICE.

HARRY A. CUMFER, OF CHICAGO, ILLINOIS, ASSIGNOR TO GUYTON & CUMFER MFG. CO., OF CHICAGO, ILLINOIS, A CORPORATION OF ILLINOIS.

MACHINE FOR MAKING ASPHALT ROOFING.

Application filed May 26, 1921. Serial No. 472,860.

*To all whom it may concern:*

Be it known that I, HARRY A. CUMFER, a citizen of the United States, residing at Chicago, in the county of Cook and State of Illinois, have invented certain new and useful Improvements in Machines for Making Asphalt Roofing, of which the following is a specification.

This invention relates to improvements in machines for making asphalt roofing.

One of the objects of the invention is to provide a machine for concurrently applying granular, comminuted and relatively refractory material, such as flake or granular mineral, soap stone, mica, or the like, to both sides of a moving asphalt coated roofing sheet.

Another object is to provide such a machine which will keep the finely divided covering materials of the respective sides entirely separate.

Another object is to provide a machine by which the finely divided materials are distributed evenly upon both surfaces of the moving sheet and by which the excess or surplus material is returned to the source of supply to be used again, thus keeping the unattached materials in circulation.

Another object is to provide in a machine of the character described improved means for distributing the relative finely divided materials on a moving flat surface, such as a roofing sheet, and the provision of automatic means to return the surplus that fails to adhere to the sheet, to the source of supply.

Another object is to provide a machine which covers both sides of a moving sheet at the same time, while the plastic coatings of each side are in proper condition to receive the granular, flake or powdered material.

Other, further and more specific objects of the invention will become readily apparent, to persons skilled in the art, from a consideration of the following description when taken in conjunction with the drawings, wherein:—

Fig. 2 is a side elevation shown diagrammatically, and

Fig. 3 is a diagrammatic showing of the sheet of material as it passes thru the machine, and the means of feeding and distributing the granular material to the sheet and partially submerging it therein.

In all the views the same reference characters are employed to indicate similar parts.

Figure 1:
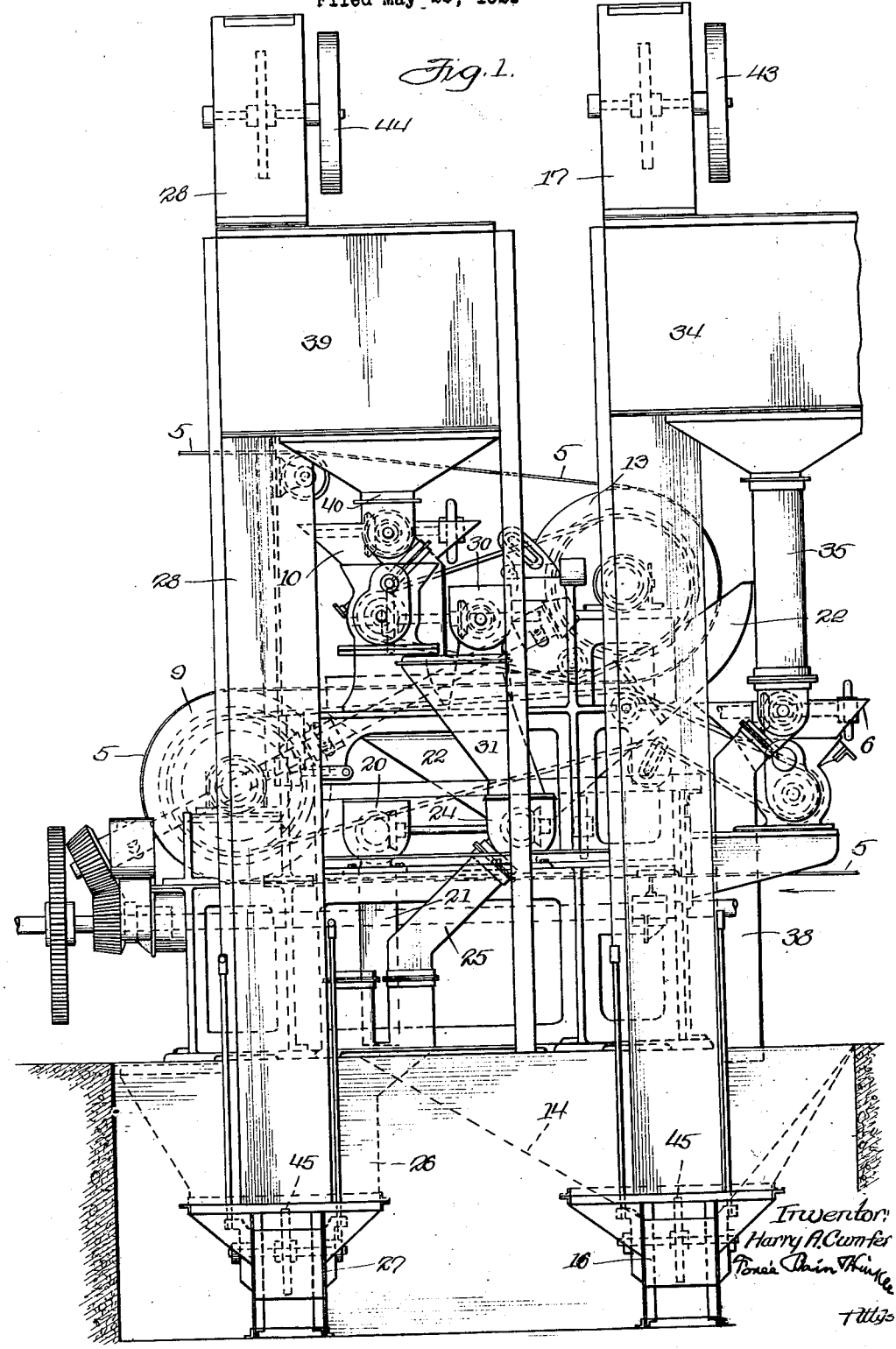
Fig. 1 is an end elevation of a machine embodying the invention.

In the diagrammatic showing in Fig. 3, 5 represents the roofing sheet having both of its sides coated with a suitable asphalt plastic material, into the surface of which granular flaky or powdered mineral, or the like, is to be partially embedded to make it adhere thereto. In the manufacture of such commodities one side of the sheet is frequently covered with slate, or the like, in granular or flake form, partially embedded in the asphaltic plastic and the opposite side is usually covered at a different time with powdered mica, soap stone, or the like, and these operations are separately accomplished.

In the operation of my machine the opposite sides of the sheet may be covered with the same class of material or material of different form or character of whatever its nature, when in a finely divided state, and both sides are covered at the same time.

The machine about to be described is usually placed in a series of other machines which perform their respective functions upon a travelling sheet as it passes thru the series of such machines, in consecutive order, and as more clearly shown and explained in my copending application Ser. No. 428,562, filed December 6, 1920, wherein a sheet of felt is shown to be in constant motion from the time it leaves the original roll until it is made into a suitable commodity, to be cut into shingles or shingle simulating strips, or to be rolled into convolutions comprising rolls consisting of an elongated sheet of such finished roofing material.

In Figs. 1 and 3 the direction of motion or movement of each sheet thru the machine about to be described is clearly shown by the arrows.

As the sheet passes under the hopper 6, the rotatably driven feed rollers 7 and 8 which are as long or preferably a little longer than the width of the sheet, distribute the granular, flaky or powdered material across the top surface of the sheet 5 uniformly, so as to substantially cover the entire upper surface presented to the feed rollers. The sheet is then passed around the drum or roller 9, the contact with which embeds the deposited granular material partially into the asphaltic plastic material with which the sheet is coated to cause it to adhere thereto and to cover and hide the underlying black asphalt.

The sheet is then returned, in a horizontal plane, substantially parallel with its former path and passes below a hopper 10, containing feed rollers 11 and 12 substantially the same in character and operation as the feed rollers 7 and 8. The hopper 10 may contain a supply of material in a finely divided state, substantially the same as that contained in hopper 6, or it may contain an entirely different character of material. The first hopper, for instance, may contain powdered soapstone, mica, or the like, and the second hopper may contain a colored mineral such as slate, or the like.

In the further progress of the sheet it passes around the drum or roller 13, which in like manner embeds or partially embeds the deposited granular material into the yielding surface of the underlying plastic coating. It will be observed that when the sheet 5 passes around the roller or drum 9 it presents upwardly, that side which was formerly the bottom surface, so that after the sheet has passed the roller 13, both of its sides have been covered by suitable granular flaky or powdered material. It occurs, however, in the practical operation, and in order that the coating of the said material shall be uniform throughout that considerable of the material spills over the edges of the sheet, and that unless proper precautions are taken in the construction and operation of the machine the different class of materials employed to cover the respective sides of the sheet would otherwise become mixed and valueless for the purpose of subsequent use, or the other expedient is to waste the material and make no effort to reclaim it. Either course is wasteful and expensive and, therefore, I provide means for maintaining the granular or finely divided material separated so that which has not been utilized by its first application may subsequently be returned to be deposited on another portion of the travelling sheet.

A large hopper 14 extends almost entirely the full length of the lower flight 15, of the travelling sheet, and any of the granular material that may spill over the side edges of the sheet 5, while over the hopper, is caught in this hopper and returned thereby into a boot 16 of an elevator 17. A scraper 19 is applied to the roller 9 and scrapes off any of the material that may adhere to the roller, which material is deposited in a conveyor 20 that carries it to a down-spout 21, the lower end of which communicates with the hopper 14. The conveyor 20 is used because the down-spout 21 must extend from one edge of the travelling sheet and some means must be employed to carry the material from the opposite edge of the sheet to the down-spout.

Located between the flights 15 and 15' of the moving sheet described, is a hopper 22 which extends part way around the roller 13, and which extends fully under the flight 15' of the sheet and slightly above it, as at 23, so as to sufficiently encompass the flight to catch all of the granular material that may fall from the moving sheet before it encounters the roller 13. In the bottom of the hopper 22 is a conveyor 24 which carries the surplus material that falls into the hopper to the down-spout 25 which communicates with another large elevator feeding hopper 26, at the bottom of which is a boot 27 of the elevator 28. A scraper 29 is also placed in contact with the surface of the roller 13 to scrape off any granular or flaky material that may adhere to the surface of the roller and which is caught in the conveyor 30, by which it is carried to the down-spout 31, which is in communication with the down-spout 25 and communicates with the larger lower hopper 26.

The material that is to be deposited on the upper side of the sheet 5 as it appears in flight 15 is placed in the feeding hopper 14 at the bottom of the elevator 17. The series of buckets 32 that are connected to a chain 33 of the elevator and which extend to the boot 16, elevates the material and deposits it in a supply hopper 34 located above the machine from which it is fed by gravity thru the down-spout 35 into the conveyor 36. The bottom of the conveyor, overlying the rollers 7 and 8, is perforated, as at 37, to more evenly distribute the granular or powdered material upon the top of the feed rollers 7 and 8. Any excessive material coming thru the conveyor 36 which is not fed into the hopper 6 thru the perforations 37 is carried thru the down-spout 38, back into the hopper 14, from which it may again be raised by the conveyor and travel the same route.

The granular or powdered material for the opposite side of the sheet is deposited in the conveyor hopper 26 from which it is taken by a similar elevator 28 into the general supply hopper 39, from which it is fed by a pipe 40 into the conveyor 41. The bottom of the conveyor 41 is perforated, as at 42, along its length overlying the hopper 10 and the feed rollers 11 and 12, so as to evenly distribute the granular or powdered material that may fall upon or around the feed rollers for deposit upon the upper surface of the sheet.

The elevators 17 and 28 are substantially the same in every respect, being driven by the respective wheels or pulleys 43 and 44, and each of the elevators is provided with a sprocket wheel 45 in its respective boot, around which the chains 33 and attached buckets pass in elevators of this construction.

The elevators and conveyors are in constant operation during the progress of the sheet thru the machine, and suitable means is shown in Figs. 1 and 2 for driving the various instrumentalities to carry the inventive concept into practical operation.

The specific means and mechanism for carrying the invention into effect is not of present interest, and many variations may be made in the means and disposition of the parts that may be employed for the purpose, within the scope of the appended claims.

The apparatus described and the sheet are in constant motion and the operations are automatically performed in suitable timed relation.

Having described my invention what I claim as new and desire to secure by Letters Patent, is:—

1. A machine of the character described comprising means for distributing divided material from a source of supply on one side of a moving coated sheet; means to partially embed said material into the sheet to cause it to adhere thereto; means to reverse the sheet to cover the other side; means to distribute divided material on the uncovered side; means to partially embed the last applied material in the sheet; thus concurrently covering both sides of the sheet and means to return the excess material to said source of supply.

2. A machine of the character described comprising two sources of supply for finely divided material for covering both sides of a coated sheet; means for feeding said finely divided material from one source of supply and distributing it on one side of the moving sheet; means for partially embedding said material in the sheet to cause it to adhere thereto; means for reversing the sheet, to turn the covered side down; means for feeding the finely divided material from the other source of supply and distributing it on the opposite, upturned side of the sheet; means for partially embedding the last applied material in the sheet, thus concurrently covering both sides of the sheet and means to return the excessive divided material not deposited on the sheet to their respective sources of supply.

3. A machine of the character described comprising an organized self-contained structure providing two horizontally spaced apart rollers, one above the other about which a sheet of roofing material having a plastic coating on each of its sides is to be passed, providing two horizontal spaced-apart substantially parallel flights; means between the flights for depositing and distributing finely divided material on one side of the sheet of the lower flight; two remote sources of material supply; means above the upper flight for depositing and distributing finely divided material on the other side of the sheet, contact with said rollers serving to partially embed said material into the presented surfaces of the respective sides of the sheet and means to catch and return unattached finely divided material to respective sources of supply.

4. A machine of the character described comprising two horizontally spaced apart rollers, one above the other, about which a sheet of roofing material having a plastic coating on each side is to be passed, providing two horizontally extending vertically spaced apart substantially parallel flights; means between the flights for depositing and distributing finely divided material on one side of the sheet of the lower flight and means above the upper flight for depositing and distributing finely divided material on the other side of the sheet, contact with said rollers serving to partially embed said materials into the presented surfaces of the respective sides of the sheet; a hopper below each flight, to catch excessive material applied to the sheet; conduits to conduct the material to separate elevators and elevators for raising the finely divided material, one for each distributor, and conduits to convey said material from the delivery end of said elevators to the respective distributors and to return the excess material to the elevators.

5. A machine of the character described comprising means for directing a moving sheet of roofing material having a plastic coating on one of its sides; an elevator for raising finely divided material to be deposited on the coated side of the sheet; a distributor for depositing said material on said sheet; means to partially embed said material in the coated surface of the sheet; a conveyor to conduct said material from the elevator to the distributor, and means to catch and return the unattached material to the elevator.

6. A machine of the character described comprising means for directing a moving sheet of roofing material having a plastic coating on each of its sides; two elevators for raising finely divided material to be deposited on the respective coated sides of the sheet; distributors, one for each elevator, for depositing said material therefrom on the respective sides of said sheet; means to partially embed said materials in the coated surfaces of the sheet; a conveyor to conduct said material from each elevator to the respective distributors and means to separately catch and return the unattached material to the respective elevators.

7. A machine thru which a continuous sheet coated with a plastic adhesive may be made to pass, comprising means to distribute finely divided material on one side of the sheet; means to partially embed said material into the plastic of said sheet and means to return to the sheet the excess of adhesive which failed to adhere to the sheet to be again distributed upon the adhesive of the sheet.

8. A machine thru which a continuous sheet coated on both sides with a plastic adhesive may be made to pass, comprising means to reverse the sheet; means to distribute finely divided material on both sides of the sheet; a conduit from a source of supply to convey the material to the distributing means; a conduit to convey the excess of material back to the source of supply and conveyors for said conduits.

In testimony whereof I hereunto subscribed my name.

HARRY A. CUMFER.